(12) United States Patent
Jukkala

(10) Patent No.: US 10,551,473 B2
(45) Date of Patent: Feb. 4, 2020

(54) UNDERWATER TRACKING SYSTEM

(71) Applicant: UWIS OY, Turku (FI)

(72) Inventor: Esko Jukkala, Turku (FI)

(73) Assignee: UWIS OY, Turku (FI)

(*) Notice: Subject to any disclaimer, the term of this patent is extended or adjusted under 35 U.S.C. 154(b) by 801 days.

(21) Appl. No.: 15/029,320

(22) PCT Filed: Oct. 15, 2014

(86) PCT No.: PCT/FI2014/050781
§ 371 (c)(1),
(2) Date: Apr. 14, 2016

(87) PCT Pub. No.: WO2015/055894
PCT Pub. Date: Apr. 23, 2015

(65) Prior Publication Data
US 2016/0259029 A1 Sep. 8, 2016

(30) Foreign Application Priority Data

Oct. 18, 2013 (FI) .................................. 20136033

(51) Int. Cl.
*G01S 1/72* (2006.01)
*G01S 5/30* (2006.01)
*G01S 15/87* (2006.01)

(52) U.S. Cl.
CPC ....... *G01S 1/72* (2013.01); *G01S 5/30* (2013.01); *G01S 15/876* (2013.01)

(58) Field of Classification Search
CPC ... G01S 1/72; G01S 15/87; G01S 5/30; G01S 15/876; G01S 15/88; B63C 11/02;
(Continued)

(56) References Cited

U.S. PATENT DOCUMENTS 5,331,602 A * 7/1994 McLaren ............ G01S 5/0009
367/127
2002/0064092 A1 5/2002 Nishimura
(Continued)

FOREIGN PATENT DOCUMENTS

CN 1547039 A 11/2004
JP 7-110380 A 4/1995
(Continued)

OTHER PUBLICATIONS

International Search Report for PCT/FI2014/050781 dated Dec. 23, 2014.
(Continued)

*Primary Examiner* — Isam A Alsomiri
*Assistant Examiner* — Amie M Ndure
(74) *Attorney, Agent, or Firm* — Sughrue Mion, PLLC

(57) ABSTRACT

A method comprises transmitting (901) a first ultrasonic ping signal from a first floating unit (M1). The first ultrasonic ping signal is received in an underwater device (D1, D2, D3). After a predetermined delay from the reception of the first ultrasonic ping signal, the underwater device transmits (905) a second ultrasonic ping signal from the underwater device. The second ultrasonic ping signal is received in the first floating unit. The first floating unit determines a time difference between a time of transmission of the first ultrasonic ping signal from the first floating unit and a time of reception of the second ultrasonic ping signal, and based on the time difference, provides location information and/or other information to the underwater device by transmitting (910) to the underwater device sequential underwater ultrasonic ping signals such that time differences between the sequential underwater ultrasonic ping signals indicate the provided information.

41 Claims, 7 Drawing Sheets

(58) Field of Classification Search
CPC ......... B63C 11/26; H04B 11/00; H04B 13/02; B63B 22/16
See application file for complete search history.

(56) References Cited

U.S. PATENT DOCUMENTS

| | | | |
|---|---|---|---|
| 2005/0219950 A1* | 10/2005 | Rowe | G01S 5/0226 367/118 |
| 2007/0014189 A1* | 1/2007 | Basilico | G01S 1/72 367/128 |
| 2008/0037370 A1* | 2/2008 | Crowell | H04B 11/00 367/127 |
| 2009/0067289 A1* | 3/2009 | Lee | G01S 15/74 367/87 |
| 2013/0084887 A1* | 4/2013 | Akiyama | H04W 52/0245 455/456.1 |
| 2013/0218456 A1* | 8/2013 | Zelek | G01C 21/3652 701/412 |
| 2015/0019053 A1* | 1/2015 | Gosling | G01S 19/14 701/21 |

FOREIGN PATENT DOCUMENTS

| | | |
|---|---|---|
| JP | 10-239417 A | 9/1998 |
| JP | 2006-78329 A | 3/2006 |
| WO | 2013/128187 A1 | 9/2013 |

OTHER PUBLICATIONS

Communication dated Nov. 2, 2017 issued by the European Patent Office in counterpart application No. 14853396.1.

* cited by examiner

UNDERWATER TRACKING SYSTEM

CROSS REFERENCE TO RELATED APPLICATIONS

This application is a National Stage of International Application No. PCT/FI2014/050781 filed Oct. 15, 2014, claiming priority based on Finnish Patent Application No. 20136033 filed Oct. 18, 2013, the contents of all of which are incorporated herein by reference in their entirety.

FIELD OF THE INVENTION

The present invention relates to wireless communications, and more particularly to a positioning system.

BACKGROUND OF THE INVENTION

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Scuba diving is a form of underwater diving in which a diver uses a self-contained underwater breathing apparatus to breathe underwater. Buddy and team diving procedures are intended to ensure that a scuba diver who gets into difficulty underwater is in the presence of a similarly equipped person who can offer assistance. Divers may communicate basic and emergency information using hand signals, light signals, and rope signals, and more complex messages may be written on waterproof slates. Satellite-based positioning systems, such as the global positioning system GPS, enable determining an accurate location on the Earth's surface. However, GPS signals do not propagate underwater.

Sonar refers to a technique using sound propagation to navigate, communicate with or detect objects on or under the surface of water. The acoustic frequencies used in sonar systems vary from very low (infrasonic) to extremely high (ultrasonic). Ultrasound is a sound pressure wave with a frequency greater than the upper limit of the human hearing range. Ultrasound devices operate with frequencies from 20 kHz up to several gigahertz.

BRIEF DESCRIPTION OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus and a computer program product as defined in the independent claims. Further embodiments of the invention are disclosed in the dependent claims.

An aspect of the invention relates to a method comprising transmitting a first ultrasonic ping signal from a first floating unit; receiving the first ultrasonic ping signal in an underwater device; after a predetermined delay from the reception of the first ultrasonic ping signal in the underwater device, transmitting a second ultrasonic ping signal from the underwater device; receiving the second ultrasonic ping signal in the first floating unit; determining a time difference between a time of transmission of the first ultrasonic ping signal from the first floating unit and a time of reception of the second ultrasonic ping signal in the first floating unit; based on the time difference, providing location information and/or other information to the underwater device by transmitting from the first floating unit to the underwater device sequential underwater ultrasonic ping signals such that time differences between the sequential underwater ultrasonic ping signals indicate the provided information.

A further aspect of the invention relates to a positioning system comprising an underwater device, the underwater device comprising an ultrasonic transceiver configured to receive and transmit ultrasonic signals; at least one floating unit configured to float on the surface of water; wherein the first floating unit comprises an ultrasonic transmitter configured to transmit a first underwater ultrasonic ping signal; wherein the underwater device comprises an ultrasonic transceiver configured to receive the first underwater ultrasonic ping signal, and after a predetermined delay from the reception of the first underwater ultrasonic ping signal, transmit a second underwater ultrasonic ping signal; wherein the first floating unit comprises an ultrasonic receiver configured to receive the second underwater ultrasonic ping signal; wherein the system comprises a processor configured to determine a time difference between a time of transmission of the first underwater ultrasonic ping signal from the ultrasonic transmitter and a time of reception of the second underwater ultrasonic ping signal in the ultrasonic receiver; wherein the system is configured to provide, based on the time difference, location information and/or other information to the underwater device by transmitting from the first floating unit to the underwater device sequential underwater ultrasonic ping signals such that time differences between the sequential underwater ultrasonic ping signals indicate the provided information.

A still further aspect of the invention relates to an underwater device comprising an ultrasonic transceiver configured to receive and transmit ultrasonic signals; wherein the ultrasonic transceiver is configured to receive a first underwater ultrasonic ping signal from a first floating unit comprising an ultrasonic transmitter; after a predetermined delay from the reception of the first underwater ultrasonic ping signal, transmit a second underwater ultrasonic ping signal to the first floating unit comprising an ultrasonic receiver configured to receive the second underwater ultrasonic ping signal; and receive location information and/or other information from the first floating unit as sequential underwater ultrasonic ping signals such that time differences between the sequential underwater ultrasonic ping signals indicate the information to be received, based on a time difference between a time of transmission of the first underwater ultrasonic ping signal from the ultrasonic transmitter and a time of reception of the second underwater ultrasonic ping signal in the ultrasonic receiver.

A still further aspect of the invention relates to a surface unit comprising a first floating unit configured to float on the surface of water; wherein the first floating unit comprises an ultrasonic transmitter configured to transmit a first underwater ultrasonic ping signal; wherein the first floating unit comprises an ultrasonic receiver configured to receive a second underwater ultrasonic ping signal sent by an underwater device after a predetermined delay from the reception of the first underwater ultrasonic ping signal; wherein the surface unit comprises a processor configured to determine a time difference between a time of transmission of the first underwater ultrasonic ping signal from the ultrasonic transmitter and a time of reception of the second underwater ultrasonic ping signal in the ultrasonic receiver; wherein the surface unit is configured to provide location information and/or other information to the underwater device by transmitting from the first floating unit to the underwater device sequential underwater ultrasonic ping signals such that time differences between the sequential underwater ultrasonic ping signals indicate the provided information.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of preferred embodiments with reference to the attached drawings, in which.

DETAILED DESCRIPTION OF THE INVENTION

A feature of knowing the exact underwater position of a diver may increase the safety of the diver, assist in training different types and levels of divers, and increase efficiency while the diver is working underwater.

Figure 1:
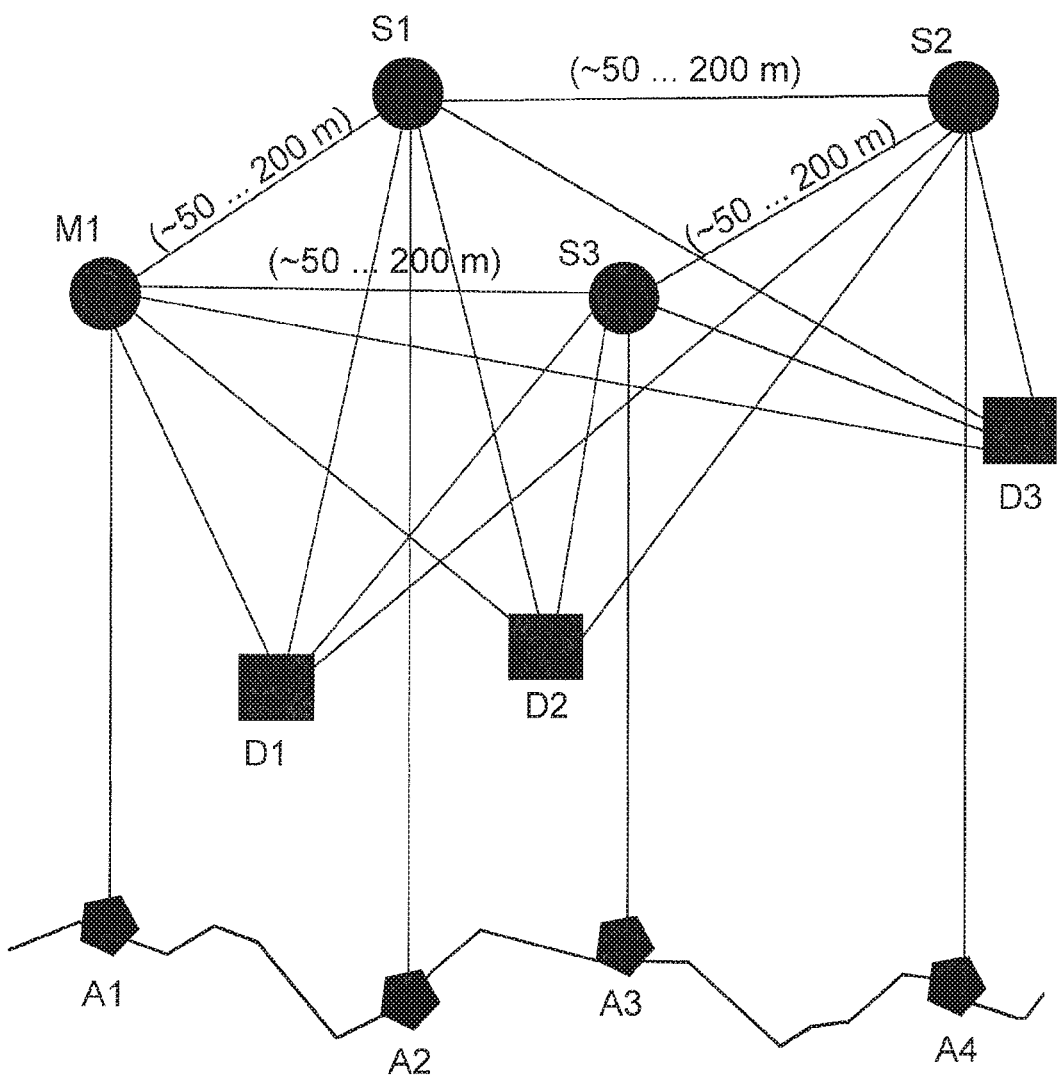
FIG. 1 illustrates a diver tracking system according to an exemplary embodiment.

FIG. 1 illustrates an exemplary embodiment, in which four floating buoys M1, S1, S2, S3 are provided on the sea (see). These buoys may be connected with wires to an anchor A1, A2, A3, A4 respectively in the bottom of the sea. One of the buoys is a master M1 and the others are slaves S1, S2, S3. The location of each buoy is known by means of a GPS device connected e.g. to the top of the buoys. The master buoy M1 has a sonar for sending an acoustic signal (e.g. an ultrasonic ping of about 5 ms) in the water every full second, for example (e.g. at predetermined time intervals of about one second). At the same time the master M1 is configured to send a message signal to the slaves S1, S2, S3 indicating a time mark that the ultrasonic ping has been sent. The message signal may be sent by using a radio signal (such as GSM, UMTS, LTE/LTE-A), infrared communication, a fixed cable or wireless connection or any other communications technology that may be used for indicating the starting time (zero point) of measurement, such as an embedded solution radio frequency (RF) module. For example, XBee and XBee-PRO 802.15.4 OEM RF modules are embedded solutions providing wireless end-point connectivity to devices. These modules use an IEEE 802.15.4 networking protocol for fast point-to-multipoint or peer-to-peer networking.

The embodiments are not, however, restricted to the system given above as an example, but a person skilled in the art may apply the solution to other communication systems provided with the necessary properties. For example, the connections between different network elements may be realized with internet protocol (IP) connections.

According to an exemplary embodiment, each diver D1, D2, D2 in a group of divers has a device (e.g. a device with a microphone) which is able to receive the sonar ping sent by the master M1. Each of the divers has a dedicated window of time during which a ping purposed for a diver is expected to arrive. The time windows are assigned before the dive; for example, such that the first diver D1 has a window $1w$ (e.g. seconds 1, 4, 7, 10, . . . ), the second diver D2 has a window $2w$ (e.g. seconds 2, 5, 8, 11, . . . ), the third diver D3 has a window $3w$ (e.g. seconds 3, 6, 9, 12, . . . ) (see FIG. 2). When the ping is received by the diver's device the diver's device replies to the ping with its own ping (after a predetermined delay to echoes to dissipate, which ping may be an ultrasonic acoustic signal of about 5 ms). Said ping sent by the diver's device is received by each of the buoys M1, S1, S2, S3, S4. The reception time of the ping from the first diver and the locations of the buoys are used to calculate a relative position of the first diver to the master M1. The location of the diver may be calculated by using triangulation on the times the buoys receive the ping from the diver. The same may be repeated for each diver at the respective time windows.

Figure 2:
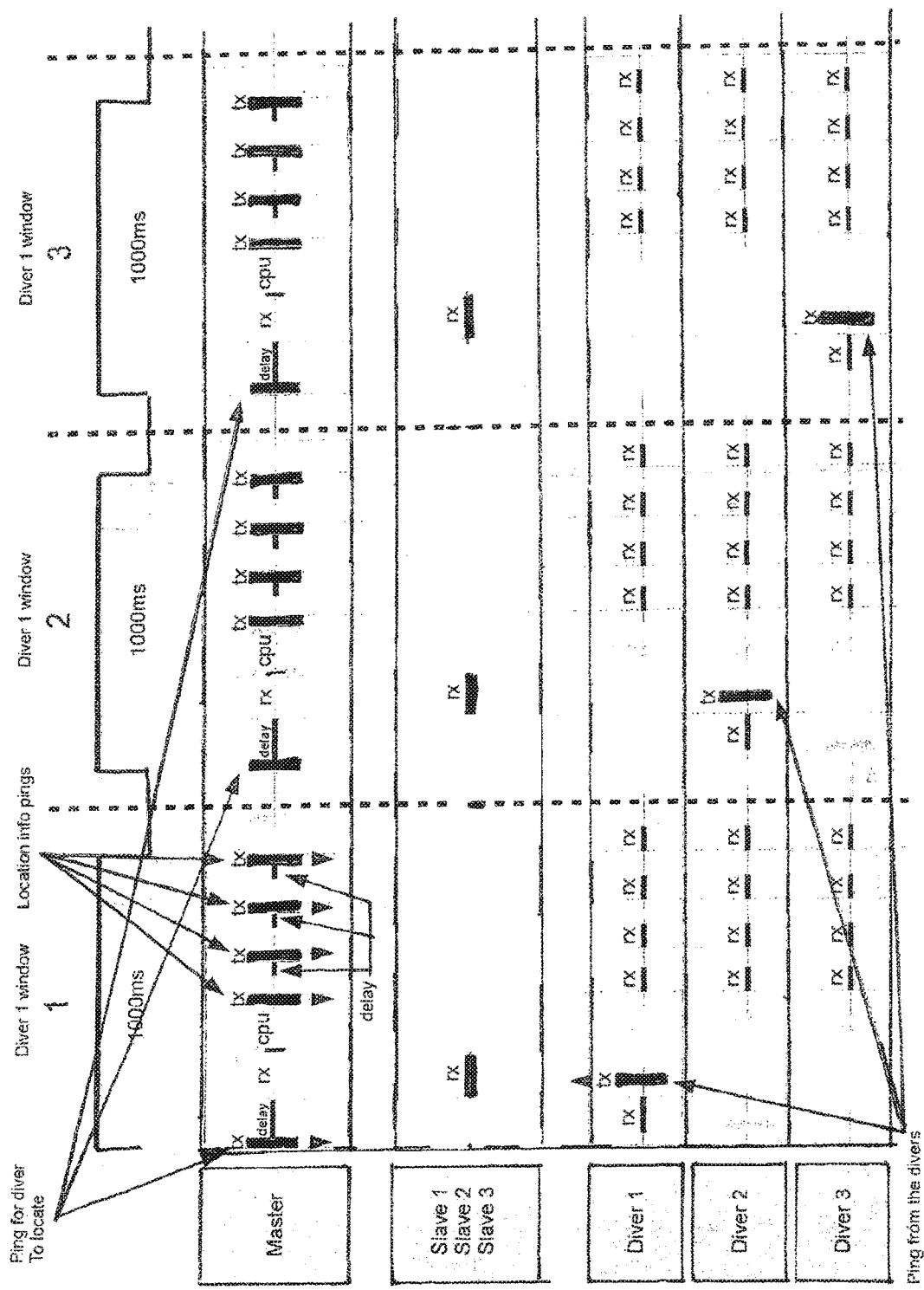
FIGS. 2 and 3 illustrate an ultrasonic communication protocol according to an exemplary embodiment.

Thus, an ultrasonic communication protocol according to an exemplary embodiment is illustrated in FIG. 2. For example, the master may send (tx) a ping, wherein the ping is received (rx) by each diver (divers D1, D2, D3), but only diver D1 replies to the ping in the first time window.

According to an exemplary embodiment, an ultrasound frequency from about 40 kHz to about 70 kHz (e.g. about 60 kHz) is used for the ultrasound signals. However, an exemplary is not limited to these frequencies, instead any suitable frequency may be utilized. For example, the frequency to be used may be selected in order to avoid natural sources of disturbance (e.g. to avoid frequencies of the sound of breaking waves, rain drops etc.) and/or human sources of disturbance (e.g. to avoid frequencies of the sound of boats, ships), to take the travelling of sound in the water into consideration, especially from the point of view of frequency-dependent scattering and attenuation, and/or to avoid frequencies that may disturb sea animals (e.g. to avoid 100 kHz to 150 kHz frequencies used by many dolphins).

Figure 3:
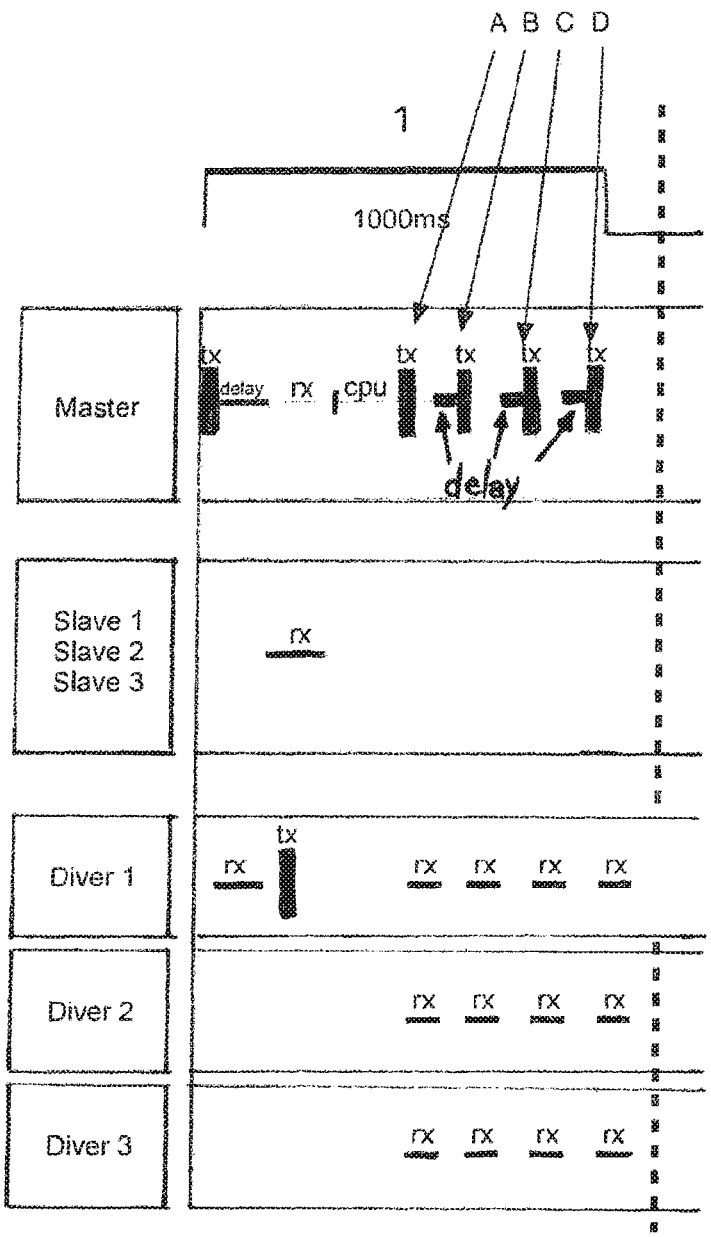

According to an exemplary embodiment, the calculated location of the diver is communicated back to the diver during the same communication window. The master may send, after a predetermined calculation time (CPU in FIG. 3) four more pings (i.e. location info pings). The time delay between the location info pings indicates the location of the diver in respect to said master in x, y and z directions (see FIG. 3). I.e. the time between pulses A and B corresponds to the location in x direction in respect to the master, the time between pulses B and C corresponds to y direction in respect to the master, and the time between pulses C and D corresponds to z direction in respect to the master. In another exemplary embodiment, an absolute location (i.e. geographical coordinates (or parts of them), e.g. latitude, longitude, and/or depth) of an underwater device is communicated to the underwater device, such that the time delay between the location info pings indicates the location.

Thus, an exemplary embodiment involves a method and an apparatus for underwater navigation systems. An exemplary arrangement involves divers with a navigational device, and a plurality of buoys, one of which acts as a master buoy M1 The navigational device sends ultrasonic audio signals to the buoys for triangulation purposes, and the master buoy may send the location information back to the diver in the form of Cartesian (or spherical) coordinates using sequential pings.

In an exemplary embodiment, the diver's device (also referred to as a diver device) D1, D2, D3 sends an ultrasonic audio signal to the buoys M1, S1, S2, S3 for triangulation purposes. The master buoy M1 sends the location information back to the diver in the form of Cartesian (or spherical) coordinates using sequential pings.

In an exemplary embodiment, the diver device sends an ultrasonic audio signal to the buoys, wherein the buoys calculate (by means of triangulation) the location of the diver device. The master buoy sends the location information back to the diver device (and to the other diver devices in the group) in the form of Cartesian (or geographical/spherical) coordinates using sequential pings such that the delay between pulses (i.e. the sequential pings) sent by the master buoy indicates the x, y and z values (or latitude, longitude, and optionally depth). Thus, each diver device receives the information on the location of said diver device.

In an exemplary embodiment, the location information is transmitted from the master buoy as consecutive ultrasonic pings. An exemplary embodiment provides an advanced communication protocol for communicating the location information from the buoy to the diver devices.

An exemplary embodiment enables providing absolute underwater x, y and z positions of a set of up to about 10 divers in real time to each diver and to a crew on the surface. An exemplary system comprises three or more floating buoys, each equipped with a GPS capability, a radio frequency communication capability and a capability to detect sonar pulses. At least one of the buoys is the master buoy that is also able to send sonar pulses for measurement and underwater communication. The divers are provided with equipment capable of receiving and sending sonar pulses.

In an exemplary embodiment, the accuracy in diver depth measurement may be improved e.g. by adding one or more commercially available pressure sensors to a diver main unit.

Figure 4:
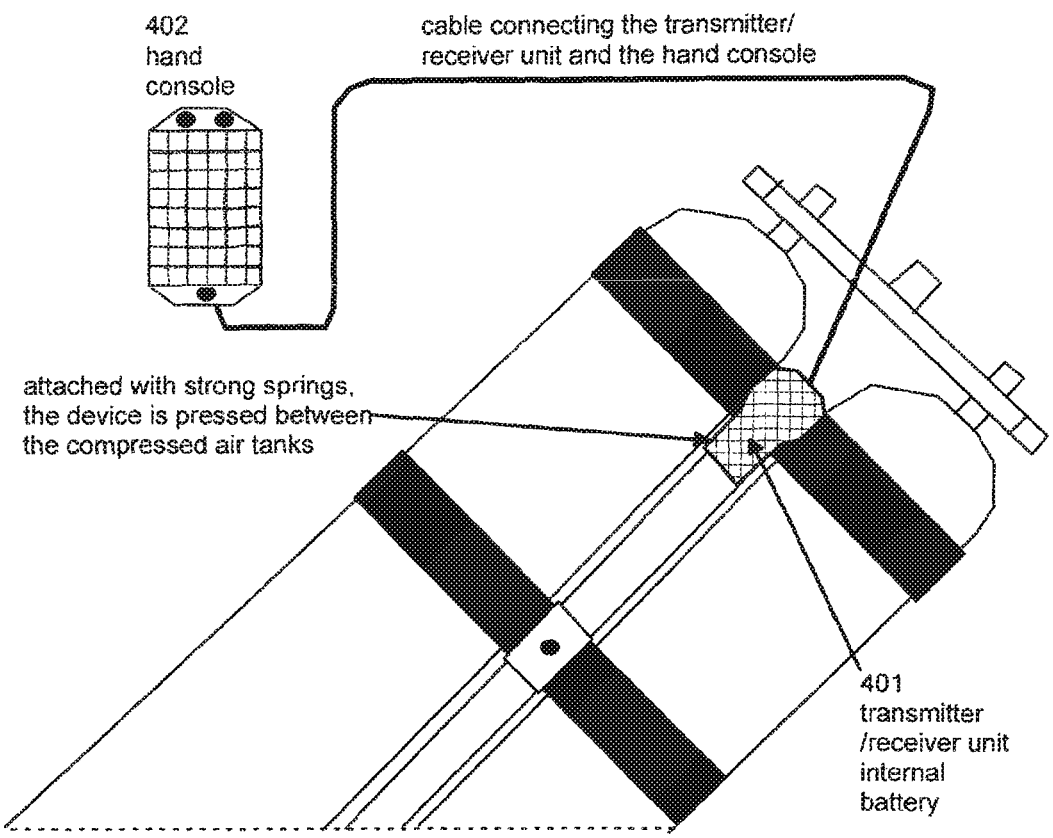
FIG. 4 illustrates a diver device according to an exemplary embodiment.
Figure 5:
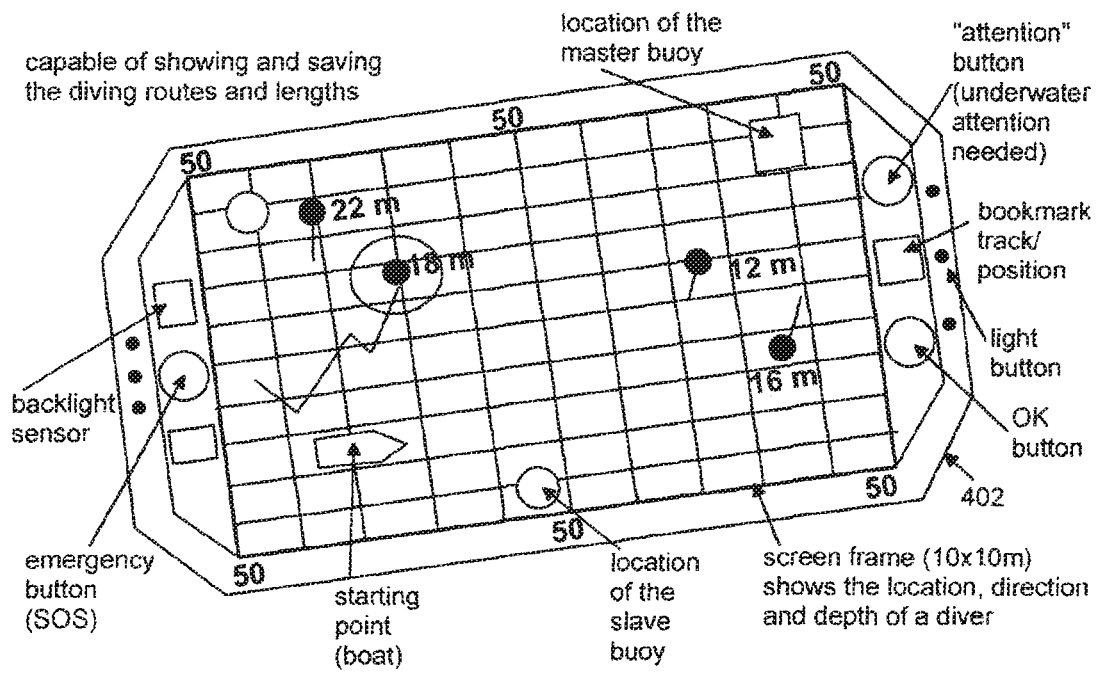
FIG. 5 illustrates a hand console of a diver device according to an exemplary embodiment.

An exemplary embodiment discloses a wireless positioning system providing absolute underwater x, y and z positions of a set of up to about 10 divers in real time to each diver and to the crew on the surface of the sea. An exemplary system comprises equipment on the surface water and a diver device used by the diver under water. The equipment on the surface of the water may comprise a PC system (e.g. on the diving boat), a charger (e.g. on the diving boat), a buoy (floating on the water) which may comprise two parts: 1) an electronics module M1 (master) or S1, S2, S3 (slave), and 2) a buoy body including an anchor with a chain and a rod with a signal flag (which may be marked with "M1" or "S1", "S2", . . . , "Sn"). The diver device may include two parts: 1) a diver main unit 401 including a cable (to be placed on the back of the diver and attached into compressed air tanks), and 2) a hand console 402 (to be placed in the diver's arm) (see FIGS. 4 and 5). The diver main unit 401 may include springs to attach the diver main unit 401 e.g. between the compressed air tanks 403.

The exemplary system may be utilized e.g. by a group of divers or by a company offering diving excursions or diving work services. Since the most common risk involved in diving is losing one's diving partner ("buddy") or other team members, each diver benefits from knowing in real time the diver's own position including depth and the other divers' positions including depth. By knowing this one is able to avoid panic, get help sooner in case of emergency, bookmark positions of special interest and track the actual diving route.

An exemplary system may be utilized e.g. by active (semi-professional) divers, i.e. experienced divers who want to dive in depths of about 20-80 m and even down to depths of about 100-150 m with special equipment. These divers are typically looking for shipwrecks, interesting geological formations or various fish species. An exemplary system may be utilized e.g. by SAR (search and rescue) and/or the navy, i.e. authorities that benefit from the possibility to plan and get feedback of the preplanned diving routes. Professional training may include open sea conditions, large diving areas and long lasting diving sessions at a time. Underwater mine destruction with special anti-magnetic equipment is an example of a situation where the system may be utilized.

In an exemplary embodiment, the distance between different diver groups is at least about 200 m (to avoid inter-group disturbance in the system). In an exemplary embodiment, the maximum diving depth is from about 100 m to about 150 m.

An exemplary embodiment enables showing in real time the exact location of the diver underwater, guiding the diver back to the diving boat or starting point, marking an interesting location, and indicating where one's diving partner is located.

An exemplary embodiment is able to provide absolute underwater x, y and z positions of a set of up to about 10 divers in real time to each of the divers and to the crew on the surface of the sea. An exemplary embodiment enables increasing the safety level of diving, and it may be utilized together with existing safety routines/technologies.

Another exemplary embodiment provides a connection to the internet (via the surface unit), thus making it possible, for example, to view and track actual diving routes of the diver in real time on a computer by using a web browser.

Figure 6:
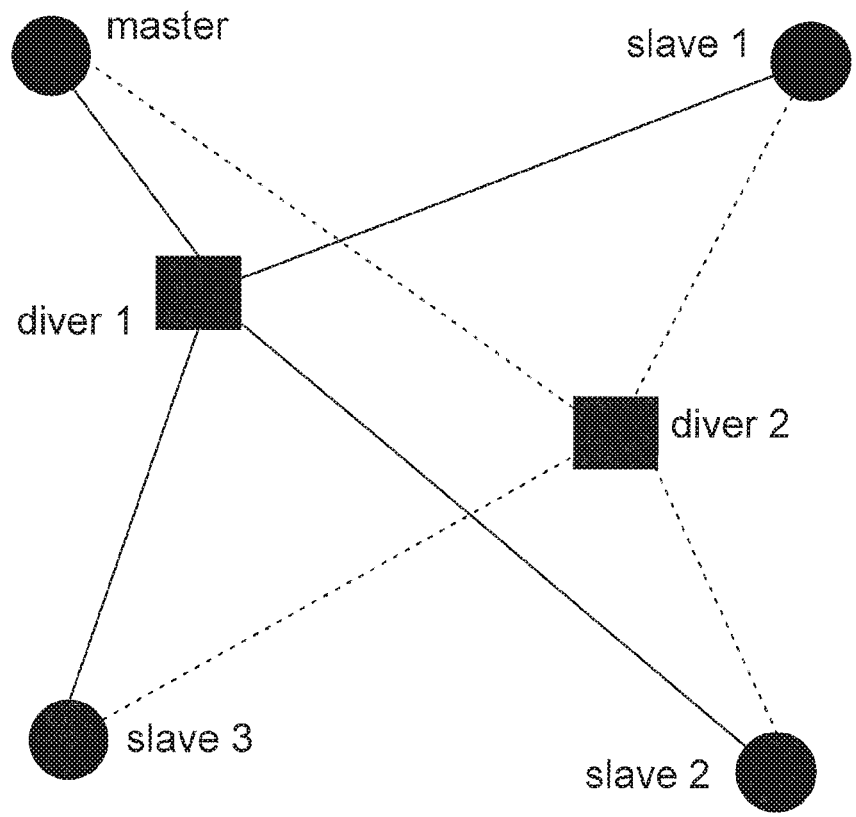
FIG. 6 illustrates displaying of positions and status of divers on a PC display according to an exemplary embodiment.

An exemplary diver tracking system may include a real time x, y and z positions being displayed on the screen of the diver's hand console. The underwater position accuracy of the diver position may be e.g. about ±1 m horizontally and ±1 m vertically. The display of the diver's hand console may include the diver's own position and/or a (paired) buddy diver's position; the diver's own actual diving track with possible bookmark points of interest marked by the diver; the positions of each of the other divers in the group; the positions of the master buoy and the slave buoys, an automatic brightness control of the display, "alarm", "attention" and/or "ok" buttons for messaging to the other group members and to the PC system (i.e. the diver device is configured to recognize an act by the diver, e.g. the diver pressing a button, in order to transmit an "alarm", "attention" and/or "ok signal). The PC system may display the positions and status of each diver in real time (see FIG. 6). The status may be displayed as a three-dimensional presentation; or it may be displayed as a two-dimensional presentation, wherein the vertical position of the diver may be given as numerical value in connection with the diver (e.g. as the depth in meters and/or the distance to the master buoy).

A further exemplary embodiment provides a possibility to feed target GPS coordinates (e.g. a shipwreck position) into a memory of the master buoy. Once each buoy is in the water the master buoy is able to indicate the target position in relation to the buoys (or as an absolute position).

A yet further exemplary embodiment provides a possibility to transfer the actual diving route of each diver during the whole diving session (or a part of it) from the master buoy into an external memory (for example, a USB memory stick or memory card) for later viewing and analysis on a computer (e.g. at home or office).

In an exemplary embodiment, other location information, such as a paired buddy diver's position, the diver's diving track information, the positions of other divers in the group, the position of the first floating unit, the positions of the second floating units displayed, and/or the position of a target of interest, may be communicated to the underwater device by transmitting, from the master buoy to the underwater device, a ping signal sequence that is specific to the location information, such that time differences between the signals in the ping signal sequence indicate the location information (absolute or relative location).

An exemplary embodiment may provide a connection of the PC system to the internet; a possibility to view and track the actual diving routes of the divers in real time on the computer with a web browser; a possibility to store an individual diver's actual diving route into a memory, for later viewing on a home/office computer; a possibility to store the actual diving routes of the divers on a cloud service; and/or a possibility to draw and share (by the cloud service) one's own sea terrain charts by using an open source (shareware) software.

In an exemplary embodiment, the diver main unit 401 may be used without the hand console 402. With this kind of device, only the diving master and/or the crew on the surface are able to view each diver's positioning on the screen of the PC system. This type of solution is useful, for example, in recreational tourist diving safaris.

Figure 7:
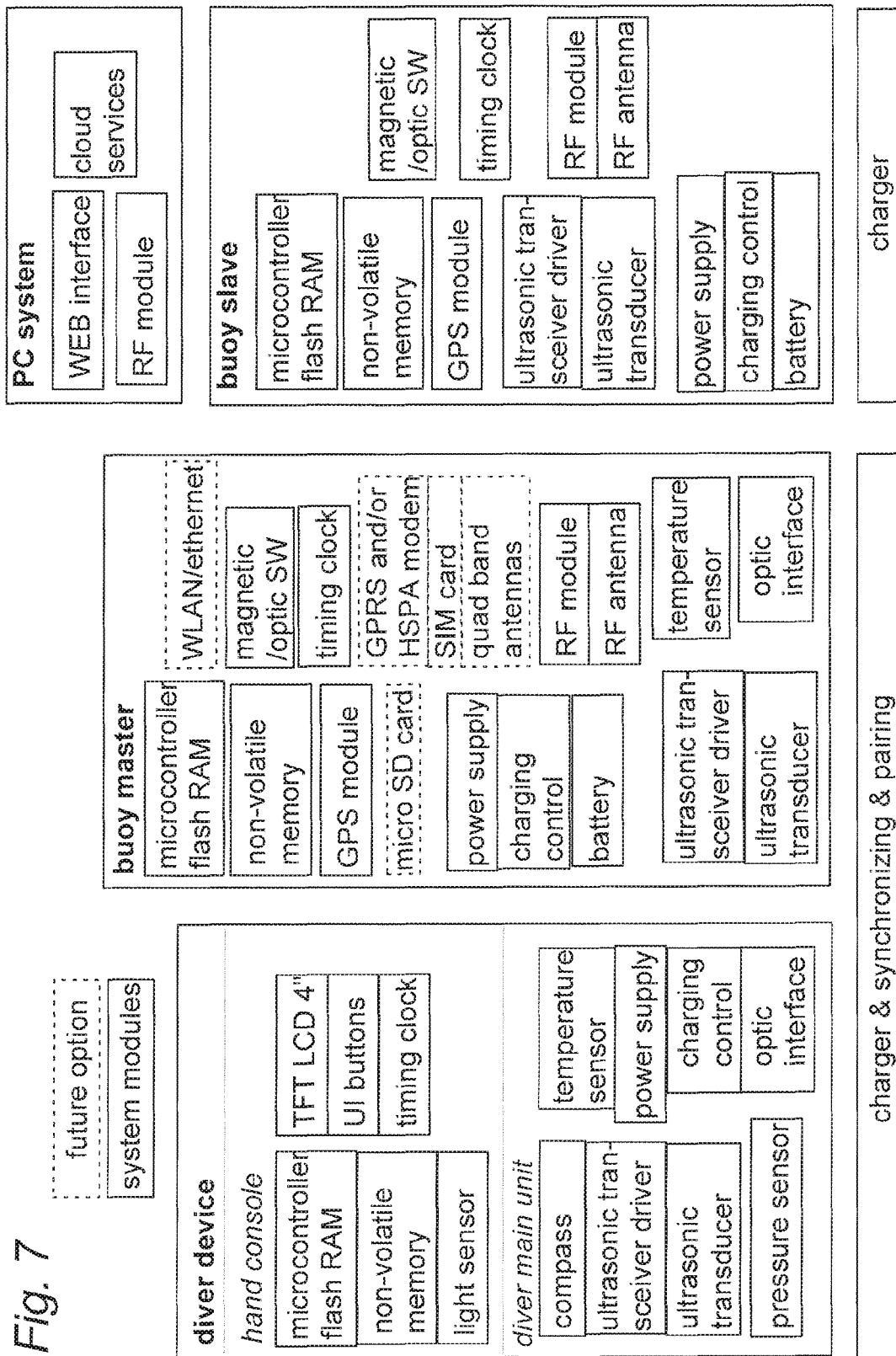
FIG. 7 is a block chart illustrating an exemplary hardware system.

FIG. 7 is a block chart illustrating the main blocks of an exemplary hardware system. A charger unit may be configured to take care of charging the batteries of the devices. It may also enable active system parts set up to a time base. Each active unit is to be placed in the charger e.g. when a "take into use" has been pressed. The diver device is given a diver ID number "diver 1", "diver 2" etc. according to a slot number in the charger.

When the system is set up, the electronics module M1 (master) or two or more slaves S1, S2, S3 are to be placed in an appropriate place in the respective buoy bodies on the water. The diver devices D1, D2, D3 may be configured to be in a stand-by state until they are in the water. When the diver device is in the water, the diver device may be configured to go to an "on" state. The diver device is configured to receive a signal (burst I) from the electronics module (i.e. from the master buoy). The diver device is configured to wait until a predefined time delay (such as 50 ms) has passed and then send an ultrasonic burst (burst to "up"), and the electronics module is configured to receive the ultrasonic burst sent by the diver device. A delay between sending burst I from the electronics module and receiving the burst (sent by the diver device) in the three (or more) buoys is used for calculating distance information. Thus the system is able to calculate how far away the diver (i.e. the diver device) was at that moment from the three buoys, and provide information on the calculated location to the diver devices. The distance information may then be displayed as a point (e.g. as a dot) on the screen of the hand console of the diver. The divers are differentiated from each other by different time slots. The maximum amount of divers that the system is able to handle at the same area may comprise, for example, about 10 divers.

The time window per diver device may be e.g. 1 second, so that the location information for each diver device in a group of 10 diver devices is updated at 10 second intervals (i.e. every 10 seconds). If the number of objects to be tracked is higher, the updating interval per device to be located may be longer (for example, if there are 100 objects to be located, the updating interval per object may 100 seconds). The time window per device is not limited to 1 second, but it may be of any suitable length. The time window may be adjustable, and it is predetermined before a diving session.

The real position of the three (or more) buoys is known by GPS receivers attached to the electronics module M1 and to the two or more electronics modules S1, S2, S3. Thus, even when the buoy location is changed by a few meters e.g. by the wind, it is possible to compensate the change. The PC system may be configured to record the locations of each active part (i.e. of the diver devices D1, D2, D3 and the electronics modules M1, S1, S2, S3), for example, about every second. The real time status and/or the recorded information may be shared via a communication link.

The diver device may also include a pressure sensor in order to calculate the depth of the diver, based on information obtained from the pressure sensor. The time slots of the system allow information sharing from and to the diver device. For example, the diver device may receive x, y and z coordinate information and display that as an "I am here" point on the diver's hand console.

If the diver device is configured to measure its own depth, it may first transmit a ping to indicate the location, and then the diver device may transmit a second ping to indicate its depth; thus, the diver device transmits two pings such that the time difference between these two pings indicates the depth (according to a predetermined communication protocol) as measured by the pressure sensor of the diver device. A suitable delay (e.g. 50 ms) is added to deal with the echoes. The master buoy transmits the diver location to each diver device.

The system may also be able to show to each diver where the buoys are located. By means of the diver device, the diver is also able to see where his/her "buddy" is. The time slot structure may also be able to provide "attention", "SOS", "everything is ok" etc. signals.

Ultrasound is used underwater to perform distance measurements and to relay measurement information to parties involved by means of sonic pulses. The measurement and the communication of the measurement information may suffer from echoes. Solid objects may generate echoes. Echoes may possibly be generated by boundaries defined by a rapid change in the temperature or salinity within the body of the water. Therefore, an exemplary embodiment uses isolated pulses combined with sufficient delays to let the echoes dissipate (both in the measurement and in the communication).

An exemplary system enables providing absolute positions of a set of divers (e.g. up to 10 divers) in real time (e.g. at about 10 s intervals) to each diver in the set and to the crew on the surface. The system comprises three or more buoys each equipped with GPS, radio frequency communication and a capability to detect sonar pulses. One of the buoys is the master buoy that is also able to send sonar pulses for measurements and underwater communication. The divers are provided with equipment capable of receiving and sending sonar pulses.

The underwater communication works in time slots, i.e. it is time-synchronized. In a measuring and communicating sequence for a certain diver, the master buoy initiates the sequence by sending a single sonar pulse and by simultaneously sending a start signal to the slave buoys over radio (or by other suitable means). That event marks a time zero for that particular interval. The diver's instrument (i.e. the diver device) in turn monitors the signal sent by the master buoy (i.e. by the electronics module of the master buoy), without knowing the exact time of transmission. When the diver device receives the sonar pulse it first pauses for a predetermined time period (e.g. 50 ms) to let possible echoes to dissipate and then sends a single sonar pulse directed to each of the buoys (double pulses may be used to mediate extra information). Each of the buoys mark the arrival times of the sonar pulse sent by the diver device, and the slave buoys (i.e. the electronics modules of the slave buoys) use the radio communication link to pass, to the master buoy, the information on the arrival times of the sonar pulse sent by the diver device. The master buoy calculates the three-dimensional position of the diver (i.e. of the diver device) based on the known positions of the buoys and the measured arrival times by using geometrical principles. The master buoy then sends the three-dimensional position of the diver device in question to each of the divers, such that the three-dimensional position is coded in time delays between sonar pulses. The described sequence of measuring and passing the results may take place within a time span of approximately one second. The next sequence covers the next diver and so on.

Figure 8:
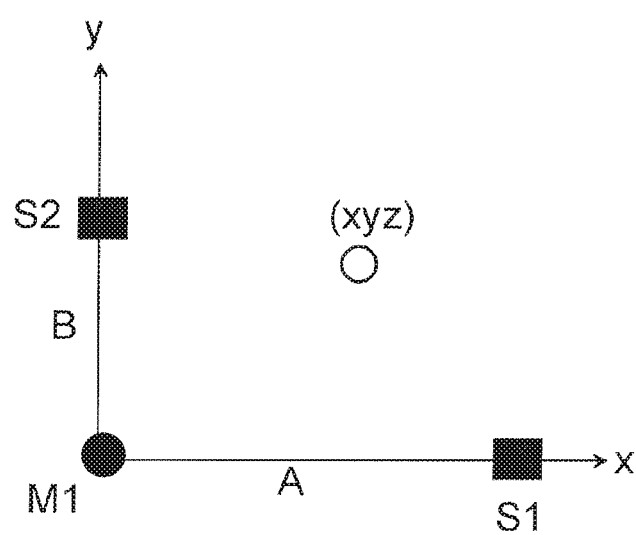
FIG. 8 illustrates placement of master and slave buoys according to an exemplary embodiment.

FIG. 8 illustrates an exemplary placement of the buoys. "M1" represents the master buoy and "S1" and "S2" represent the slave buoys (but an exemplary embodiment is not limited to the use of only three buoys, instead there may be four or more buoys in the system). FIG. 8 illustrates a situation where the angle S1-M1-S2 is 90 degrees (but an exemplary embodiment is not limited to the use of only a 90 degrees angle, instead the angle may be of any degree). The coordinates may be rotated, e.g. so that the x-axis points to the east and the y-axis points to the north and/or vice versa. In FIG. 8, parameter A represents the distance between the master M1 and the slave S1 (e.g. 100 m), parameter B represents the distance between the master M1 and the slave S2 (e.g. 80 m), wherein v=the speed of sound in the water=1500 m/s, TM=the arrival time of the response from the diver at (xyz) to the master M (subtract the first delay, e.g. 50 ms), TS1=the arrival time of the response from the diver at (xyz) to the slave S1 (subtract the first delay, e.g. 50 ms), TS2=the arrival time of the response from the diver at (xyz) to the slave S2 (subtract the first delay, e.g. 50 ms).

Thus, the following equations may be formed:

$$x^2 + y^2 + z^2 := \frac{T_M^2 \cdot v^2}{4} \quad (1)$$

$$(A-x)^2 + y^2 + z^2 := \left(T_{S1} - \frac{T_M}{2}\right)^2 \cdot v^2 \quad (2)$$

$$x^2 + (B-y)^2 + z^2 := \left(T_{S2} - \frac{T_M}{2}\right)^2 \cdot v^2 \quad (3)$$

Thus, regarding the diver position (xyz):

$$x := \frac{T_M^2 \cdot v^2}{8 \cdot A} - \left(T_{S1} - \frac{T_M}{2}\right)^2 \cdot \frac{v^2}{2 \cdot A} + \frac{A}{2} \quad (4)$$

$$y := \frac{T_M^2 \cdot v^2}{8 \cdot B} - \left(T_{S2} - \frac{T_M}{2}\right)^2 \cdot \frac{v^2}{2 \cdot B} + \frac{B}{2} \quad (5)$$

$$z := -\sqrt{\frac{T_M^2 \cdot v^2}{4} - x^2 - y^2} \quad (6)$$

An exemplary diver tracking system comprises a PC system (a laptop PC or a tablet computer) with appropriate add-ons, cables and interfaces; a charger for charging the batteries of the diver main units and buoys and for syncing and pairing the diver main unit; buoys (at least 1×master and 2×slave) including an anchor with a chain and a rod with a signal flag (e.g. marked with M1, S1, S2 accordingly); and a diver device comprising a main unit (including a battery and a cable) and a hand console. Instructions for the use and maintenance of the system may also be provided.

Although an apparatus has been depicted as one entity, different modules and memory may be implemented in one or more physical or logical entities. The apparatus may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory may include volatile and/or non-volatile memory and typically stores content, data, or the like. For example, the memory may store computer program code such as software applications (for example for the electronics modules, the PC system and/or for the diver device) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 9:
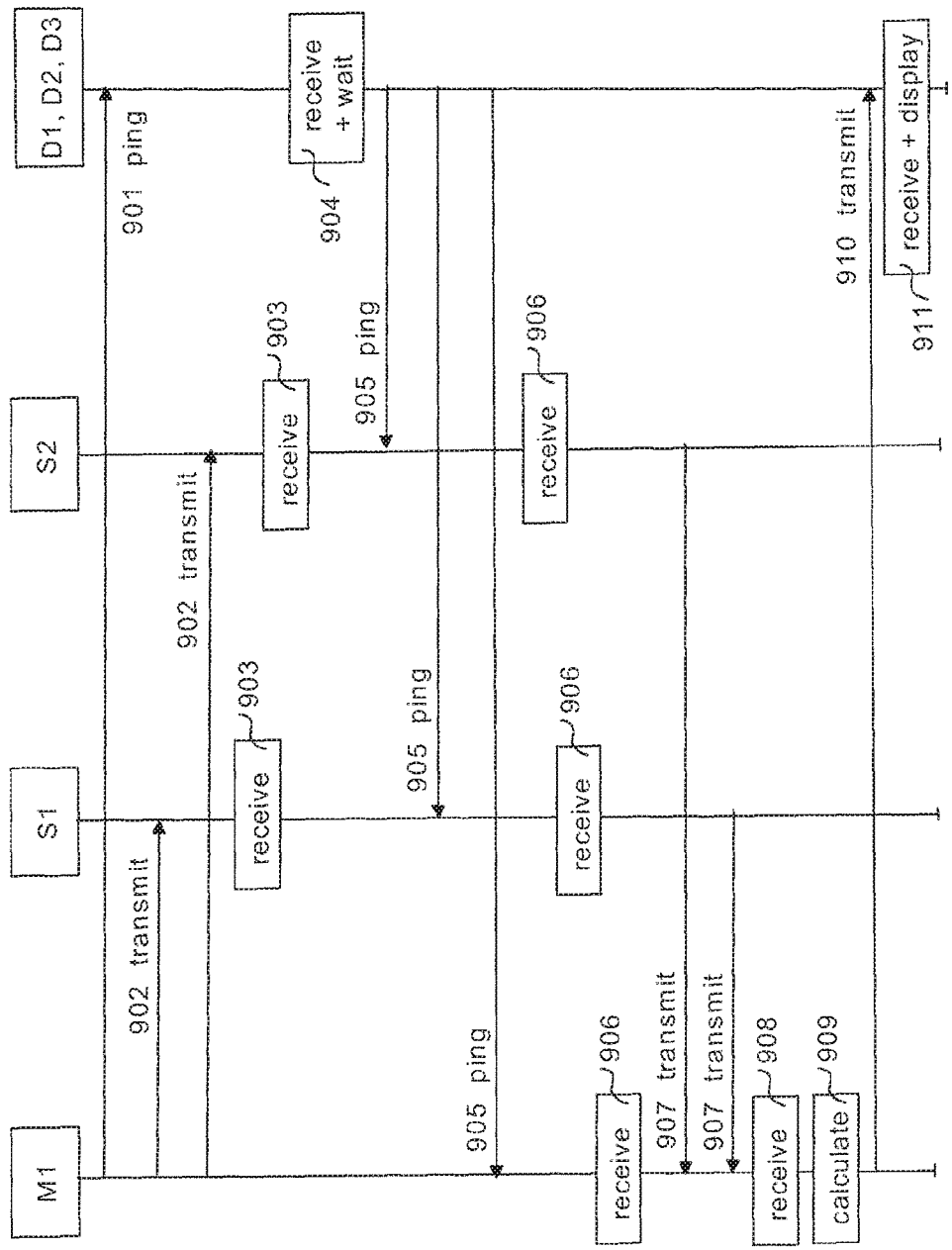
FIG. 9 shows a messaging diagram illustrating an exemplary messaging event according to an embodiment of the invention.

The signaling chart of FIG. 9 illustrates the required signaling. In the example of FIG. 9, an apparatus M1 (which may comprise e.g. a first floating unit including an ultrasonic transceiver) may transmit, in item 901, an ultrasonic ping signal to an apparatus D1, D2, D3 (which may comprise an underwater device, e.g. a diver device D1, D2, D3, including an ultrasonic transceiver). In item 902, in response to transmitting the ultrasonic ping signal 901, the apparatus M1 is configured to transmit a radio signal to an apparatus S1, S2 (which may comprise e.g. a second floating unit including an ultrasonic receiver) to indicate a time mark when the ultrasonic ping 901 was sent. In item 903, the radio signal 902 is received in the apparatus S1, S2. In item 904, the ultrasonic ping signal 901 is received in the diver device D1, D2, D3. In item 904, in response to receiving the ultrasonic ping signal 901, the diver device D1, D2, D3 is configured to wait for a predetermined time period (e.g. about 50 ms) until echoes caused by the signal 901 dissipate. Then, in item 905, the diver device D1, D2, D3 is configured to transmit an ultrasonic ping signal 905 (each diver device in its respective time slot). In item 906, the ultrasonic ping signal 905 is received in the apparatus M1, S1, S2. In item 907, in response to receiving the ultrasonic ping signal 905, the apparatus S1, S2 is configured to transmit a message signal 907 (e.g. a radio signal or an infrared signal or any other suitable message) to the apparatus M1 to indicate a time mark when the ultrasonic ping 905 was received in the apparatus S1, S2. In item 908, the message signal 907 is received in the apparatus M1. In item 909, the apparatus M1 may be configured to calculate the location of the diver device D1, D2, D3 based on a time difference between a time of transmission of the ultrasonic ping signal 901 from the apparatus M1 and a time of reception of the ultrasonic ping signal 905 in the floating units M1, S1, S2. In item 910, the apparatus M1 may be configured to provide the calculated location of the diver device D1, D2, D3 to the diver device D1, D2, D3 by transmitting from the apparatus M1 to the diver device D1, D2, D3 sequential ultrasonic ping signals such that time differences between the sequential underwater ultrasonic ping signals indicate the location (and/or other information) of the diver device D1, D2, D3 in respect to the apparatus M1, S1 and/or S2 (or an absolute location of the diver device). Each of the diver devices utilizes its own dedicated time window for the reception/transmission of the ping signal. The time differences between the sequential underwater ultrasonic ping signals include a predetermined delay (e.g. 50 ms) in addition to the provided information (as indicated in FIG. 2).

In an exemplary embodiment, the solution may be used any type of underwater signaling/communications that involve transmission small amounts of information. The information may comprise status information and/or location information or any other desired information.

An exemplary embodiment is not limited to the use of three or more buoys (i.e. floating units). Instead, the system may comprise e.g. only one buoy (floating unit, M1), for example, if the purpose is to determine a distance between the floating unit and an underwater device. Two floating units (M1, S1) may be used for determining a two-dimensional position of the underwater device. Three floating units (M1, S1, S2) may be used for determining a three-dimensional position of the underwater device. An exemplary embodiment is not limited to the use of one buoy as the master buoy; instead more than one floating units may act as the master buoy.

In an exemplary embodiment, a predetermined ultrasonic request signal sequence may be transmitted from a first diver device, wherein the predetermined ultrasonic request signal sequence may be transmitted in response to recognizing an act by a first diver such as a first diver pressing an alarm button, an ok button and/or an attention button on the first diver device. The predetermined ultrasonic request signal sequence may then be received in one or more second diver devices from the first diver device. Information on the received request signal sequence displaying may be displayed on a screen of the second diver device.

In an exemplary embodiment, a predetermined ultrasonic response signal sequence may be transmitted from the second diver device, wherein the predetermined ultrasonic response signal sequence may be transmitted in response to recognizing an act by a second diver such as a second diver pressing an alarm button, an attention button and/or an ok button on the second diver device. The predetermined ultrasonic response signal sequence may then be received in the first diver device from the second diver device. Information on the received response signal sequence may be displayed on a screen of the first diver device.

Thus, in an exemplary embodiment, an underwater device is configured to transmit a predetermined ultrasonic signal sequence to be received in at least one further underwater device, wherein the predetermined ultrasonic request signal sequence is transmitted in response to recognizing an act by a first diver, such as the first diver pressing an alarm button, an ok button and/or an attention button on the underwater device. The underwater device may be configured to receive a predetermined ultrasonic signal sequence from at least one further underwater device, wherein the predetermined ultrasonic signal sequence is transmitted in response to the further underwater device recognizing an act by a second diver, such as the second diver pressing an alarm button, an attention button and/or an ok button on the further underwater device. The underwater device may be configured to display on a screen of the underwater device, information on the received predetermined ultrasonic signal sequence.

In an exemplary embodiment, the signal sequence is specific to the diver device such that a time window in which the signal sequence is sent indicates the diver device that transmitted the signal sequence, and/or the signal sequence is specific to said act by the diver, such that time differences between the signals in the signal sequence indicate the act.

Thus, an exemplary embodiment also enables direct underwater communication between diver devices via ultrasound. The direct communication may include predetermined messaging such as emergency signals (alarms), or "ok" signals. For example, a diving instructor may cause transmission of an attention/request message, wherein the other divers are to respond by causing a transmission of an ok or alarm (response) message. The diver devices may be configured to recognize which of the diver devices sent the signal sequence, based on the characteristics of the sequence (e.g. how many signals there are in the sequence and what is the time difference between each signal in the sequence) and/or based on the time window in which the signal sequence was sent. Direct ultrasound communication between the diver devices is useful e.g. in a situation where the possibility for ultrasound communication between the diver device and the surface unit is blocked e.g. by an island. Each diver device utilizes its own dedicated time window for the transmission of the signals.

The steps/points, signaling messages and related functions described above in FIGS. 1 to 9 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signaling messages are only exemplary and may even comprise several separate messages for transmitting the same information. In addition, the messages may also contain other information.

In an exemplary embodiment, the solution is not limited to tracking a diver/diver device. Instead, an exemplary embodiment may be used to track/locate/communicate with any other underwater object/underwater device, such as a mechanical object provided with an exemplary underwater device.

It will be obvious to a person skilled in the art that, as the technology advances, the inventive concept can be implemented in various ways. The invention and its embodiments are not limited to the examples described above but may vary within the scope of the claims.

The invention claimed is:

1. A method for underwater communications, the method comprising
    obtaining, in a first floating unit, at least one of location information and other information based on at least one ultrasonic signal transmitted between the first floating unit and an underwater device; and
    based on the obtaining, providing the at least one of location information and other information to the underwater device by transmitting, from the first floating unit to the underwater device, sequential underwater ultrasonic ping signals such that time differences between the sequential underwater ultrasonic ping signals indicate the at least one of location information and other information.

2. A method as claimed in claim 1, wherein the method comprises
    transmitting a first ultrasonic ping signal from the first floating unit;
    receiving the first ultrasonic ping signal in the underwater device;
    after a predetermined delay from the receiving of the first ultrasonic ping signal in the underwater device, transmitting a second ultrasonic ping signal from the underwater device;
    receiving the second ultrasonic ping signal in the first floating unit;
    determining a time difference between a time of transmission of the first ultrasonic ping signal from the first floating unit and a time of reception of the second ultrasonic ping signal in the first floating unit;
    based on the time difference, providing the at least one of location information and other information to the underwater device by transmitting from the first floating unit to the underwater device the sequential underwater ultrasonic ping signals such that time differences between the sequential underwater ultrasonic ping signals indicate the at least one of location information and other information.

3. A method as claimed in claim 2, wherein the method comprises
    receiving the second ultrasonic ping signal in one or more second floating units;
    calculating the location of the underwater device based on a location of at least one floating units and a time difference between a time of transmission of the first ultrasonic ping signal from the first floating unit and a time of reception of the second ultrasonic ping signal in the first floating unit and the one or more second floating units.

4. A method as claimed in claim 3, wherein the method comprises calculating the location of the underwater device in respect to one or more of
    the first floating unit and
    at least one second floating unit.

5. A method as claimed in claim 3, wherein the method comprises determining an absolute location of the underwater device via a global position system GPS and the calculated location of the underwater device.

6. A method as claimed in claim 5, wherein the method comprises providing the absolute location of the underwater device to the underwater device by transmitting from the first floating unit to the underwater device sequential underwater ultrasonic ping signals such that time differences between the sequential underwater ultrasonic ping signals indicate the absolute location of the underwater device.

7. A method as claimed in claim 3, wherein the location of the underwater device is calculated via a triangulation method.

8. A method as claimed in claim 3, wherein the first floating unit and the one or more second floating units comprise a radio communication device for communicating with each other on a radio frequency.

9. A method as claimed in claim 2, wherein the first ultrasonic ping signal is transmitted from the first floating unit at predetermined time intervals.

10. A method as claimed in claim 2, wherein the predetermined delay from the reception of the first ultrasonic ping signal comprises a fixed delay.

11. A method as claimed in claim 1, wherein the method comprises providing the location of the underwater device to the underwater device by transmitting from the first floating unit to the underwater device sequential underwater ultrasonic ping signals such that time differences between the sequential underwater ultrasonic ping signals indicate the location of the underwater device in respect to at least one floating unit.

12. A method as claimed in claim 1, wherein each specific underwater device in a group of underwater devices is assigned a dedicated time window during which an ultrasonic ping signal purposed for a specific underwater device is expected to arrive.

13. A method as claimed in claim 1, wherein the location of the underwater device is communicated to the underwater device in a form of Cartesian coordinates or spherical coordinates.

14. A method as claimed in claim 1, wherein a depth in which the underwater device is located is calculated based on a pressure sensor value of the underwater device.

15. A method as claimed in claim 1, wherein an ultrasound frequency from about 40 kHz to about 70 kHz, preferably about 60 kHz, is used.

16. A method as claimed in claim 1, wherein the method comprises displaying positions on a screen of at least one underwater device and a surface unit, such that the displaying comprises displaying one or more of
    a diver's own position;
    a paired buddy diver's position;
    a diver's diving track;
    a diving track with points of interest marked-up;
    positions of other divers in a group;
    a position of the first floating unit;
    positions of second floating units; and
    a position of a target of interest is displayed.

17. A method as claimed in claim 1, wherein the method comprises storing positions or a diving route of the underwater device in a memory.

18. A method as claimed in claim 1, wherein the time differences between the sequential underwater ultrasonic ping signals include a predetermined delay in addition to the at least one of location information and other information.

19. A method as claimed in claim 1, wherein the underwater device comprises a diver device configured to be attached to a diver to be located.

20. A method as claimed in claim 1, wherein the underwater device comprises a diver device, the method comprising
- transmitting a predetermined ultrasonic request signal sequence from a first diver device; and
- receiving the predetermined ultrasonic request signal sequence in at least one second diver device from the first diver device;
- wherein the predetermined ultrasonic request signal sequence is transmitted in response to recognizing an act by a first diver such as a first diver pressing at least one of an alarm button, an ok button and an attention button on the first diver device.

21. A method as claimed in claim 20, wherein the method comprises
- transmitting a predetermined ultrasonic response signal sequence from a second diver device; and
- receiving the predetermined ultrasonic response signal sequence in the first diver device from the second diver device;
- wherein the predetermined ultrasonic response signal sequence is transmitted in response to recognizing an act by a second diver such as a second diver pressing at least one of an alarm button, an attention button and an ok button on the second diver device.

22. A method as claimed in claim 20, wherein the method comprises one or more of
- displaying, on a screen of a second diver device, information on a received request signal sequence; and
- displaying, on a screen of the first diver device, information on the received request signal sequence.

23. A method as claimed in claim 20, wherein a signal sequence is specific to at least one of
- the diver device such that a time window in which the signal sequence is sent indicates the diver device that transmitted the signal sequence, and
- said act by the diver, such that time differences between the signals in the signal sequence indicate the act.

24. A positioning system for underwater communications, the system comprising
- an underwater device comprising an ultrasonic transceiver configured to receive and transmit ultrasonic signals;
- at least one floating unit configured to float on the surface of water;
- wherein a first floating unit is configured to
- obtain at least one of location information and other information based on at least one ultrasonic signal transmitted between the first floating unit and the underwater device; and
- based on the obtaining, provide the at least one of location information and other information to the underwater device by transmitting, from the first floating unit to the underwater device, sequential underwater ultrasonic ping signals such that time differences between the sequential underwater ultrasonic ping signals indicate the at least one of location information and other information.

25. A positioning system as claimed in claim 24, wherein the first floating unit comprises an ultrasonic transmitter configured to transmit a first underwater ultrasonic ping signal;
- the underwater device comprises an ultrasonic transceiver configured to
- receive the first underwater ultrasonic ping signal, and after a predetermined delay from the receiving of the first underwater ultrasonic ping signal, transmit a second underwater ultrasonic ping signal;
- wherein the first floating unit comprises an ultrasonic receiver configured to receive the second underwater ultrasonic ping signal;
- wherein the system comprises a processor configured to determine a time difference between a time of transmission of the first underwater ultrasonic ping signal from the ultrasonic transmitter and a time of reception of the second underwater ultrasonic ping signal in the ultrasonic receiver;
- wherein the system is configured to provide, based on the time difference, the at least one of location information and other information to the underwater device by transmitting from the first floating unit to the underwater device sequential underwater ultrasonic ping signals such that time differences between the sequential underwater ultrasonic ping signals indicate the at least one of location information and other information.

26. A positioning system as claimed in claim 25, the system comprising
- two or more floating units configured to float on the surface of water, each floating unit comprising a radio communication device for communicating with each other on a radio frequency;
- wherein the first floating unit and one or more second floating units each comprise an ultrasonic receiver configured to receive the second underwater ultrasonic ping signal;
- wherein the system comprises a processor configured to calculate the location of the underwater device based on a location of a floating unit and a time difference between a time of transmission of the first underwater ultrasonic ping signal from the ultrasonic transmitter and a time of reception of the second underwater ultrasonic ping signal in the ultrasonic receiver.

27. A positioning system as claimed in claim 26, wherein it is configured to provide the calculated location of the underwater device to the underwater device by transmitting from the first floating unit to the underwater device sequential underwater ultrasonic ping signals such that time differences between the sequential underwater ultrasonic ping signals indicate the location of the underwater device in respect to at least one floating unit.

28. An underwater device for a positioning system, the underwater device comprising an ultrasonic transceiver configured to receive and transmit ultrasonic signals; wherein the ultrasonic transceiver is configured to
- receive, from a first floating unit, at least one of location information and other information transmitted to the underwater device as sequential underwater ultrasonic ping signals such that time differences between the sequential underwater ultrasonic ping signals indicate the at least one of location information and other information.

29. An underwater device as claimed in claim 28, wherein the ultrasonic transceiver is configured to
- receive a first underwater ultrasonic ping signal from a first floating unit comprising an ultrasonic transmitter;
- after a predetermined delay from the receiving of the first underwater ultrasonic ping signal, transmit a second underwater ultrasonic ping signal to the first floating unit comprising an ultrasonic receiver configured to receive the second underwater ultrasonic ping signal; and
- receive at least one of the location information and other information from the first floating unit as sequential underwater ultrasonic ping signals such that time differences between the sequential underwater ultrasonic ping signals indicate the information to be received, based on a time difference between a time of transmission of the first underwater ultrasonic ping signal from the ultrasonic transmitter and a time of reception of the second underwater ultrasonic ping signal in the ultrasonic receiver.

30. An underwater device as claimed in claim 29, wherein the ultrasonic transceiver is configured to
after a predetermined delay from the reception of the first underwater ultrasonic ping signal, transmit a second underwater ultrasonic ping signal to the first floating unit and one or more second floating units each comprising an ultrasonic receiver configured to receive the second underwater ultrasonic ping signal; and
receive a calculated location of the underwater device from the first floating unit as sequential underwater ultrasonic ping signals such that time differences between the sequential underwater ultrasonic ping signals indicate the location of the underwater device in respect to at least one floating unit, wherein the location of the underwater device is calculated based on a location of a floating unit and a time difference between a time of transmission of the first underwater ultrasonic ping signal from the ultrasonic transmitter and a time of reception of the second underwater ultrasonic ping signal in the ultrasonic receiver.

31. An underwater device as claimed in claim 28, wherein the underwater device comprises a diver device configured to be attached to a diver to be located.

32. An underwater device as claimed in claim 31, wherein it is configured to display positions on a screen of the underwater device, by displaying one or more of
a diver's own position;
a paired buddy diver's position;
a diver's diving track;
a diving track with points of interest marked-up;
positions of other divers in a group;
a position of the first floating unit;
positions of second floating units; and
a position of a target of interest.

33. An underwater device as claimed in claim 32, wherein it comprises one or more of
means responsive to an act by the diver for brightness control of a screen of the underwater device; and
means for transmitting at least one of an alarm, attention and ok signal to at least one of other group members and a surface unit, in response to an act by the diver.

34. An underwater device as claimed in claim 28, wherein it comprises a battery that is rechargeable by a charger.

35. An underwater device as claimed in claim 28, wherein it is configured to transmit a predetermined ultrasonic signal sequence to be received in at least one further underwater device, wherein the predetermined ultrasonic signal sequence is transmitted in response to recognizing an act by a first diver, such as the first diver pressing at least one of an alarm button, an ok button and an attention button on the underwater device.

36. An underwater device as claimed in claim 35, wherein the signal sequence is specific to one or more of
a diver device such that a time window in which the signal sequence is sent indicates the diver device that transmitted the signal sequence; and
said act by the diver, such that time differences between the signals in the signal sequence indicate the act.

37. An underwater device as claimed in claim 28, wherein it is configured to receive a predetermined ultrasonic signal sequence from at least one further underwater device, wherein the predetermined ultrasonic signal sequence is transmitted in response to recognizing an act by a second diver, such as the second diver pressing at least one of an alarm button, an attention button and an ok button on the further underwater device.

38. An underwater device as claimed in claim 37, wherein it is configured to display on a screen of the underwater device, information on the received predetermined ultrasonic signal sequence.

39. A surface unit for a positioning system, the surface unit comprising a first floating unit configured to float on the surface of water;
wherein the first floating unit comprises an ultrasonic transmitter configured to transmit a first underwater ultrasonic ping signal;
wherein the first floating unit is configured to
obtain at least one of location information and other information based on at least one ultrasonic signal transmitted between the first floating unit and an underwater device; and
based on the obtaining, provide the at least one of location information and other information to the underwater device by transmitting, from the first floating unit to the underwater device, sequential underwater ultrasonic ping signals such that time differences between the sequential underwater ultrasonic ping signals indicate the at least one of location information and other information.

40. A surface unit as claimed in claim 39, wherein the first floating unit comprises an ultrasonic receiver configured to receive a second underwater ultrasonic ping signal sent by an underwater device after a predetermined delay from the receiving of the first underwater ultrasonic ping signal;
wherein the surface unit comprises a processor configured to determine a time difference between a time of transmission of the first underwater ultrasonic ping signal from the ultrasonic transmitter and a time of reception of the second underwater ultrasonic ping signal in the ultrasonic receiver;
wherein the surface unit is configured to provide the at least one of location information and other information to the underwater device by transmitting from the first floating unit to the underwater device sequential underwater ultrasonic ping signals such that time differences between the sequential underwater ultrasonic ping signals indicate the at least one of location information and other information.

41. A surface unit as claimed in claim 40, the surface unit comprising
two or more floating units configured to float on the surface of water, each floating unit comprising a radio communication device for communicating with each other on a radio frequency;
wherein the first floating unit and one or more second floating units each comprise an ultrasonic receiver configured to receive a second underwater ultrasonic ping signal sent by an underwater device after a predetermined delay from the reception of the first underwater ultrasonic ping signal;
wherein the surface unit comprises a processor configured to calculate the location of the underwater device based on a location of a floating unit and a time difference between a time of transmission of the first underwater ultrasonic ping signal from the ultrasonic transmitter and a time of reception of the second underwater ultrasonic ping signal in the ultrasonic receiver;

wherein the surface unit is configured to provide the calculated location of the underwater device to the underwater device by transmitting from the first floating unit to the underwater device sequential underwater ultrasonic ping signals such that time differences between the sequential underwater ultrasonic ping signals indicate the location of the underwater device in respect to at least one floating unit.

* * * * *